United States Patent Office 3,457,975
Patented July 29, 1969

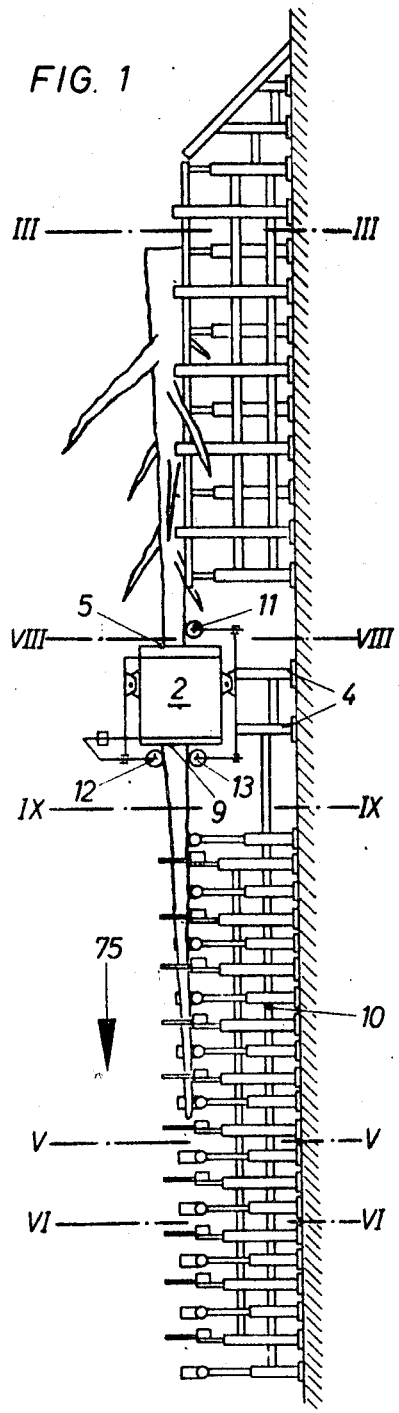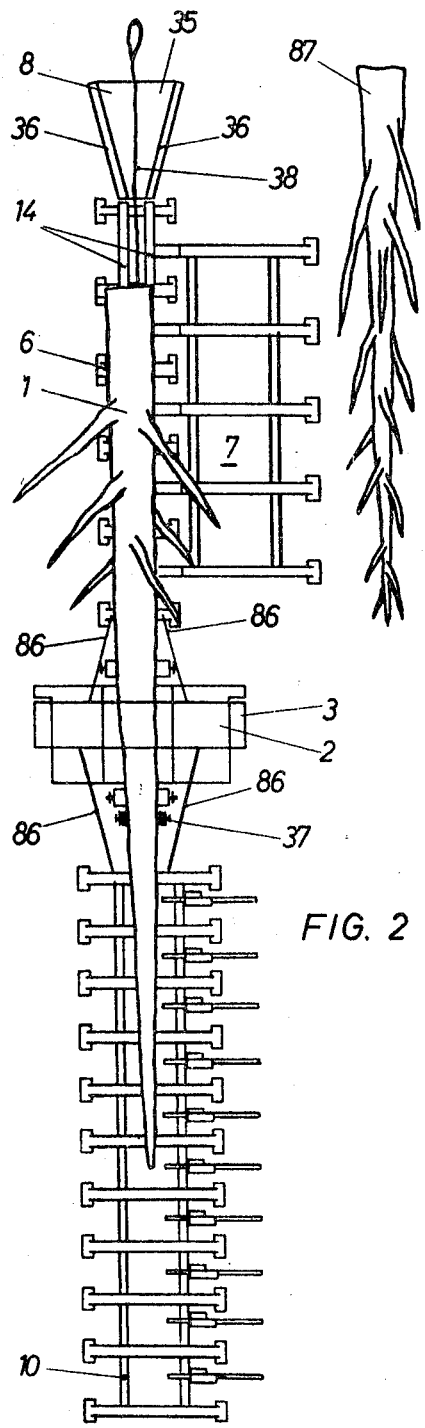

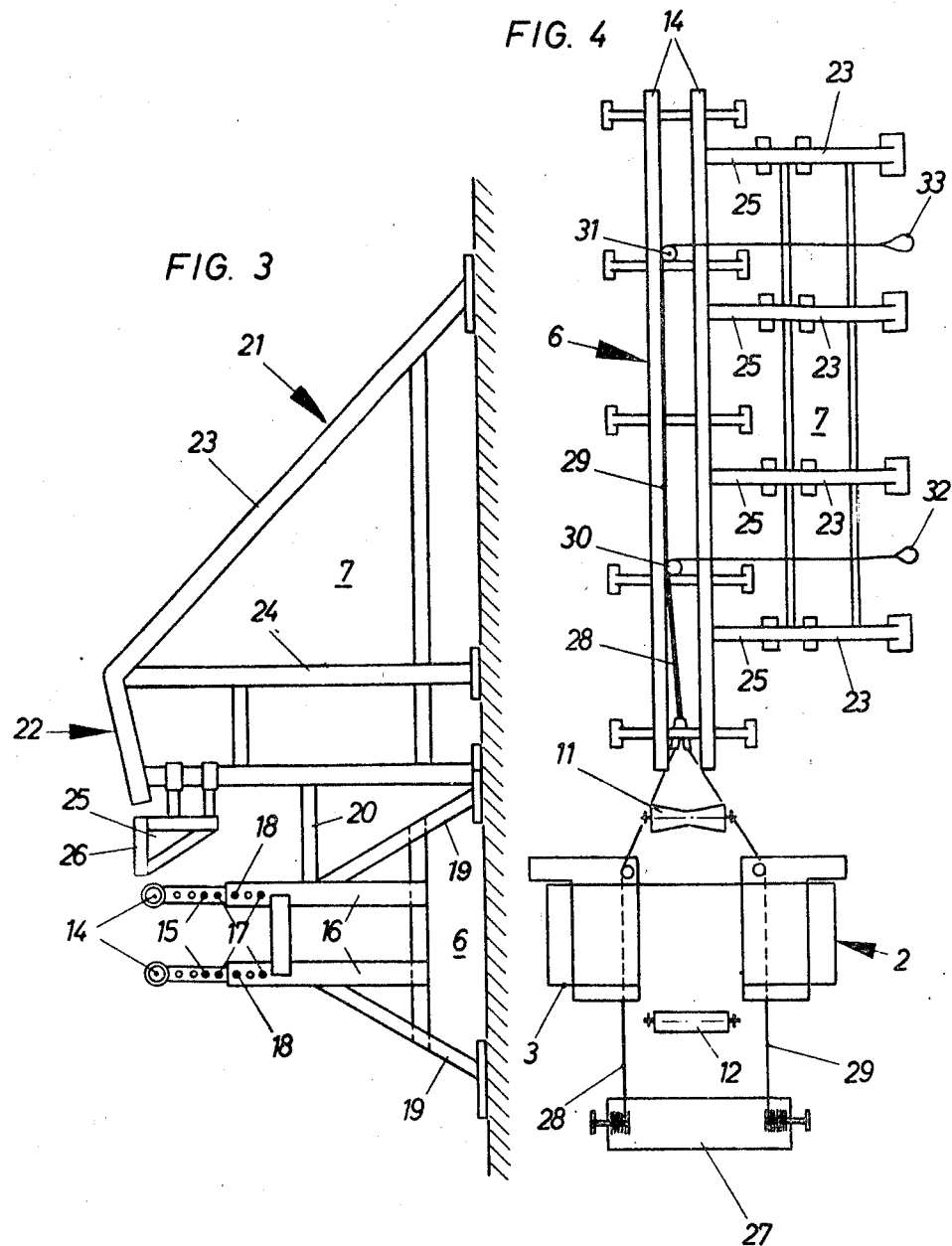

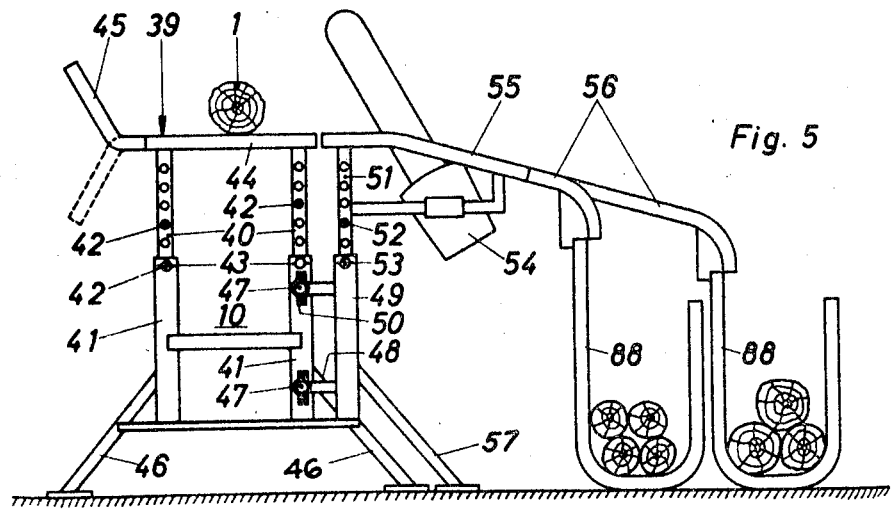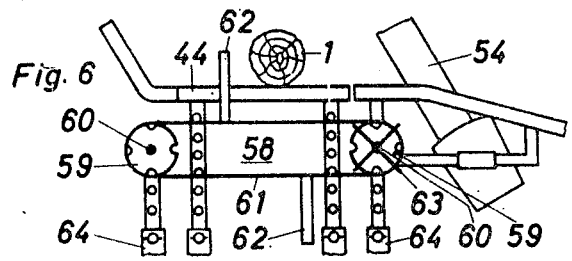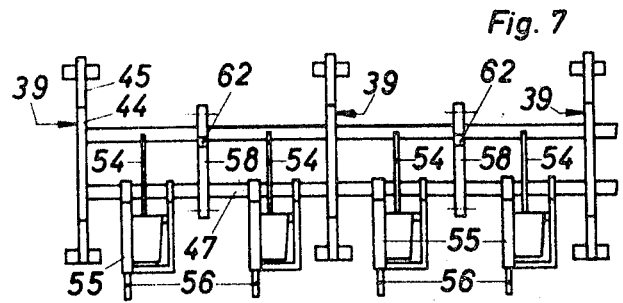

3,457,975
**APPARATUS FOR TRANSPORTING AND TREAT-
ING TREES**
Georg Wehr and Gotthold Gotze, Rotenburg an der
 Fulda, and Gerhard Streich, Ronshausen uber
 Bebra, Germany, assignors to Rotenburger Metall-
 werke GmbH, Fulda, Germany
Filed Mar. 6, 1967, Ser. No. 620,926
Claims priority, application Germany, Mar. 9, 1966,
R 42,785
Int. Cl. B27l 1/00; B27b 17/04
U.S. Cl. 144—208                                24 Claims

ABSTRACT OF THE DISCLOSURE

An apparatus for transporting and treating tree trunks including a guide frame adapted to receive the trunks, a discharge frame adapted to discharge the trunks, means for debarking and debranching the trunks disposed between the guide frame and discharge frame and having a housing with an inlet opening aligned with the guide frame and an outlet opening aligned with the discharge frame, and means to move the logs from the guide frame, through the housing, and out the discharge frame. The means for debarking and debranching said trunks also includes a first and second pair of movable frame members slidably mounted on said housing for movement in a horizontal and vertical direction, respectively, to and from a log engaging position, one of said frame members carrying saw means for debarking and debranching said trees, the frame members being mechanically coupled so that said second pair of frame members moves simultaneously with said first pair of frame members and in the same manner with respect to said logs.

BACKGROUND OF THE INVENTION

Field of the invention

This invention relates to apparatus for transporting trees from one position to another, and more particularly, to such an apparatus including means for debarking and debranching the trees.

Description of the prior art

In timber production, after the trees have been cut and have fallen, they are usually debranched, debarked, cut to desirable lengths, and sorted before they are taken away from their original falling point. The debarking and debranching is usually carried out immediately after the tree falls, particularly in the case of pine trees, in order to minimize insect attack on the trunk, and, of course, to make handling easier. The individual trees are then usually dragged or carried in any number of ways from the point where they originally fell, to the nearest device for transporting them away to the sawmill or the like.

The above-mentioned debranching and debarking of the tree at its original location is usually done by hand with an axe, saw, or peeling knife, these methods, of course, taking a great deal of time and involving a relatively large amount of labor.

It, therefore, has been proposed to provide equipment which at least mechanically debarks the fallen trees in order to simplify the handling of the timber and, of course, to increase productivity. However, for various reasons, this equipment has not proved satisfactory. For example, it has been extremely difficult to develop equipment which handles the trees properly, especially in the case when it is desired to both debark and debranch the tree trunks simultaneously.

SUMMARY OF THE INVENTION

It is therefore an object of the present invention to provide apparatus for guiding and handling tree trunks which include means for debranching and debarking the trees, which apparatus overcomes the above-mentioned disadvantages, and which is simple in construction, easy to move about, and operates in a highly satisfactory manner.

Briefly summarized, the present invention includes a guide or entrance frame, a housing for an apparatus for debarking and debranching tree trunks, and a discharge frame, said frames and housing all being aligned, along with means to transport the trunks onto the guide frame through the apparatus for debarking and debranching the trunks, and then through and out the discharge frame. The height of both the guide frame and the discharge frame are adjustable, and a plurality of guide rollers are formed adjacent the inlet opening and outlet opening of the above-mentioned housing. A winching table is disposed adjacent the guide frame for receiving the tree trunks and may be located either to the side thereof or in front thereof. The means for transporting the trunks in the above-mentioned manner may include winching means, the cables of which engage the trunks initially, and an endless chain having an abutment formed on the discharge frame for discharging the trunks laterally therefrom.

Further, crosscut saws are mounted with respect to the discharge frame and are adapted to cut the trunks into predetermined lengths as they are discharged from the discharge frame. Means are also provided to quick detachably connect the housing to the guide frame and to the discharge frame, as well as the winching table to the guide frame.

The above-mentioned apparatus for debarking and debranching the trunks includes two pairs of frame members slidably mounted with respect to the housing in a vertical and horizontal direction, respectively, to and from a log engaging position. One of the frame members may carry saw means for debranching and debarking the tree and a mechanical coupling is effected between the frame members in order that they may simultaneously move in the same direction with respect to the logs.

BRIEF DESCRIPTION OF THE DRAWINGS

Reference is now made to the accompanying drawings for a better understanding of the nature and objects of the present invention, which drawings illustrate he best mode presently contemplated for carrying out the objects of the invention and its principles, and are not to be construed as restrictions or limitations on its scope.

FIG. 1 is a side elevation of the arrangement according to the invention;

FIG. 2 is a plan view corresponding to FIG. 1;

FIG. 3 is a sectional elevation on the line III—III in FIG. 1;

FIG. 4 is a further plan view of a portion of the arrangement according to the invention, namely of the guide frame and winching table;

FIG. 5 is a sectional elevation on the line V—V in FIG. 1;

FIG. 6 is a sectional elevation on the line VI—VI in FIG. 1;

FIG. 7 is a plan view of a portion of the discharge frame of FIG. 1;

DESCRIPTION OF THE PREFERRED EMBODIMENTS

Figure 8:
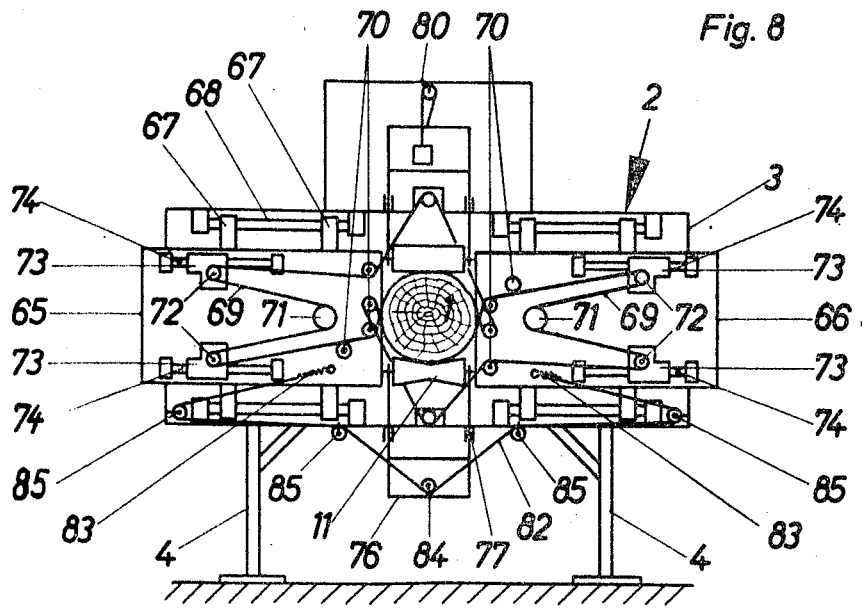
FIG. 8 is a section on the line VIII—VIII in FIG. 1.

Referring specifically to FIGS. 1 and 2, the reference numeral 2 refers to the debranching and debarking apparatus for treating a tree 1, which includes a frame structure or housing 3 supported from the ground by feet 4, it also being possible to mount apparatus 2 on the load-carrying platform of a vehicle, or the like.

In front of the inlet opening 5 of the housing 3 there is provided a guide frame 6 to which is joined a lateral winching table 7, or a frontal winching table 8, and beyond the outlet opening of the housing 3 there is provided a discharge frame 10. The guide frame 6 and the discharge frame 10 are disposed with their longitudinal axes aligned with the inlet opening 5 and the outlet opening 9, respectively, of the housing 3, and are rigidly, and preferably quick detachably, connected thereto by means of rods 86 as shown in FIG. 2. A similar connection is effected between the winching table 7 or 8 and the guide frame 6.

Adjacent the inlet opening 5 of the housing 3, a log guiding roller 11 is disposed and, adjacent the outlet opening 9, upper and lower log guiding rollers 12 and 13 are disposed, the specific manner in which these rollers are connected being discussed in detail later.

The guide frame 6 has two parallel guide tubes 14 extending parallel to its longitudinal axis and having substantially the same length as an average pine tree trunk, and being spaced apart by a distance corresponding substantially to the maximum diameter of such trunk. The horizontal guide tubes 14 are secured to the supporting columns 15, the latter being slidably mounted in retaining tubes 16 and being adjustable with respect thereto to varying heights, by means of pegs 18 fitting through holes 17 formed in the columns and tubes. Of course other means of obtaining this adjustment can be utilized, such as the use of clamping devices by which the supporting columns would be secured in the mounting tubes 16. As shown in FIG. 3, the tubes 16 are supported from the ground by feet 19.

The lateral winching table 7 may be rigidly connected to the guide frame 6 by bars 20, and has a plurality of guide tubes each of which are formed by an inclined lateral input track 21 extending from ground level to a height above the guide tubes 14, and a discharge track 22 following the input track 21 and decreasing in height to the guide tubes 14. As seen in FIG. 4, guide tubes 23 extend perpendicular to the guide tubes 14 and are supported from the ground by frame member 24.

The winching table 7 is further provided with a plurality of pivoted arms 25 which lie with their guide portions 26 between the guide tubes 14 and the guide tubes 23, and form an extension of the latter. The pivoted arms 25 are mounted to pivot with respect to the winching table 7 about a vertical axis, so as to avoid branches of the tree trunk becoming hooked or jammed into the winching table.

As will be seen from FIG. 4, two winching cables 28 and 29 are provided which extend over direction-changing rollers 30 and 31 disposed on table 7 so that the ends 32 and 33 of the cables extend perpendicular to the guide tubes 14. A twin winch 27 may be provided to control the movement of cables 28 and 29, as shown in FIG. 4.

As an alternate to the lateral winching table 7, a frontal winching table 8 may be provided at the free ends of the guide tubes 14 of frame 6. Referring specifically to FIG. 2, this frontal winching table includes a funnel-shaped entry track of sheet metal having a floor 35 sloping upwardly from the floor to the guide tubes 14 and being provided with lateral raised edges 36. In this arrangement only a single winch 37 is necessary, as seen in FIG. 2, which has a cable 38 extending in the longitudinal direction of the guide tubes 14 through the table 8.

Referring specifically to FIGS. 5-7, it is seen that discharge frame 10 comprises a plurality of discharge tubes 39 extending perpendicularly to the longitudinal axis of the frame 10 and being secured on support columns 40 which are adjustably mounted in retaining tubes 41. The discharge tubes 39 can be secured at varying heights with respect to retaining tubes 41 by means of holes 42 formed in the columns and tubes, and pegs 43 adapted to extend through these holes to fix the suport columns with respect to the retaining tubes. As in the case of frame 6, clamping devices can be provided instead of this peg-hole arrangement in order to adjustably mount the support columns in the retaining tubes.

As seen in FIG. 5, the discharge frame is supported on the ground by means of feet 46 connected at one end to retaining tubes 41. The discharge tubes 39 include a horizontal portion 44 and an angled portion 45 which is inserted in the horizontal portion 44 in two different positions, these positions being indicated in FIG. 5 by a full line and broken line. In the position indicated in full lines, the logs passing over the discharge frame can only be discharged over the right hand side of the frame, while in the position shown in the broken lines, it is also possible to discharge them off over the left hand side thereof.

On that side of the discharge frame 10 which is opposite to the angled portions 46 there are attached two mutually parallel horizontal guide tubes 47, as shown in FIGS. 5 and 7. Guide members 48 connect a plurality of vertical retaining tubes 49 to the tubes 47, clamps 50 being provided to secure the connection so that the retaining tubes are displaceable with respect to the longitudinal axis of the frame 10. Support columns 51 are slidably mounted in retaining tubes 49 and can be adjustable in height by means of pegs 53 adapted to extend through holes 52 formed in the columns and tubes. Each support column 51 has a crosscut saw 54 rigidly secured to a support member extending from the columns. Also, a downwardly curved discharge tube 55 extends from the upper end of the support columns 51 and forms an extension of the portion 44 of discharge tube 39. A downwardly curved connecting piece 56 is joined to discharge tube 55 and may take various positions with respect thereto, a pair of containers 88 being provided to receive the sawed trunks from connecting piece 56. Each retaining tube 49 is supported from the ground by the foot member 57 as shown in FIG. 5.

As shown in FIGS. 6 and 7, a plurality of log feeding devices are provided on the discharge frame 10. These devices include a plurality of pairs of wheels 59 which rotate about horizontal axis 60 extending in the longitudinal direction of the frame 10, and which are enclosed by a plurality of endless belts 61 provided with abutments 62, the free ends of which project above the discharge tubes 39. One of each pair of wheels 59 is driven by means of a capstan 63 which may, in turn, be hand driven or motor driven. The wheels 59 or their axes 60 could be directly secured to the frame 10, or could be supported from the ground by means of feet 64 as shown.

Figure 9:
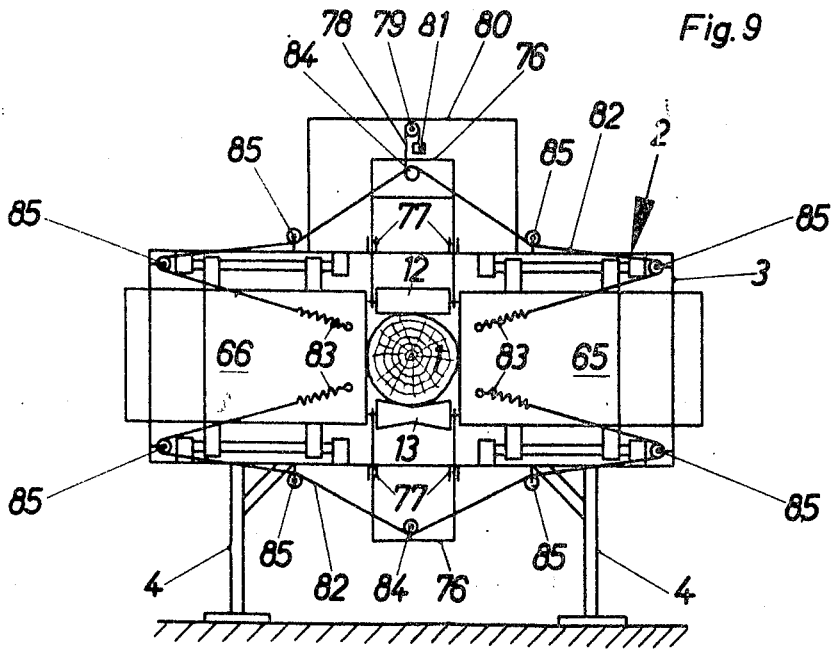
FIG. 9 is a section on the line IX—IX in FIG. 1.

The rollers 11, 12 and 13, which are adapted to engage the trunks to guide same, are better shown in FIGS. 8 and 9. As seen in these figures, the lower guide roller 11 has a V-shaped profile to insure correct guiding of the log 1 within the apparatus 2, roller 13 being of a similar shape. These rollers may be made of plastics or the like, in order to avoid rosin residues, shavings, etc. from adhering to them.

The debranching and debarking apparatus 2 is better seen in FIGS. 8 and 9 and includes two frame members 65 and 66 which are slidably mounted in a horizontal direction in the housing 3 by means of ball bearing bushings 67 connected by guide rods 68. The members 65 and 66 may be moved by hydraulic means, or the like, in a direction perpendicular to the axis of the logs 1, the exact details of the hydraulic structure not being shown in the interest of brevity. At the entrance to the debarking and debranching apparatus 2 as shown in FIG. 8, the units 65 and 66 are provided with two chain saws 69 which run over guide pinions 70 and driving pinions 71 and engage, in their operative position, opposite peripheries of the trunks so as to debranch and debark same, by means of cutting teeth formed on the chain. The exact structure and operation of this chain saw is disclosed in applicants' copending U.S. patent application Ser. No. 620,925 entitled Chain Cutter for Debranching and Debarking Trees, filed concurrently herewith.

The tension in chains 69 can be regulated by use of pinions 72 rotatably mounted on the member 73, the latter being adapted to be displaced horizontally on guide rods 74 by means of hydraulic means or the like. An endless track (not shown) may be mounted in each of the units 65 and 66 in order to effect the advancement of log 1 in the direction of arrow 75 (FIG. 1).

The log guiding rollers 11, 12 and 13 are rotatably mounted on upper and lower frame members 76 which are, turn, slidably mounted in guides 77 formed in housing 3, in a direction perpendicular to the direction of feed of the log, and to the direction of movement of the frame member 65 and 66.

The movement of frame members 65 and 66 and frame member 76 is achieved in the following manner. The lower frame 76 is normally urged away from the axis of the log 1 by its own weight, and corresponding pre-loading of the upper frame 76 in order to move it in a direction away from the axis of the log 1 is achieved by providing a tension cable 78 engaging the frame 76 and passing over a direction-reversing roller 79 secured to the projection 80 which in turn is provided on stationary housing 3. Cable 78 has a weight 81 provided on its free end, which weight is heavier than the frame member 76, including roller 12, so that the upper frame member 76 is normally urged in the direction away from the longitudinal axis of the log 1.

A pair of tension cables 82 are provided, each having its two ends respectively connected to frame member 65 and frame member 66 through tension spring 83. The cables extend over a direction-changing roller 84 secured to each of frame members 76, and two direction-changing rollers 85 rotatably mounted on frame housing 3, resulting in a positive interconnection between the movements of frame member 76 and units 65 and 66. Thus, when the frame members 76 and therefore rollers 11–13 move away from a trunk positioned in housing 3 in response to their pre-loading, frame members 65 and 66 also move apart, so that the trunk 1 is released and a new trunk can be transported. Then, after a new trunk is positioned in housing 3, the frame members 65 and 66 are moved inwardly in response to actuation of their associated hydraulic means, causing corresponding inward movement of frame member 76, and rollers 11–13.

The operation of the apparatus of the present invention is as follows. The tree trunks 87 which have just been cut, are positioned at a point laterally alongside the winching table 7 or immediately in front of the winching table 8. With the help of cables 28 and 29 or the cable 38, a trunk to be debranched and debarked is pulled up to the guide tubes 14 and passed to the apparatus 2 with its top end first. The trunk is then moved into engagement with roller 11 and then passes into the debranching and debarking apparatus 2. After being debranched and debarked, it then passes through rollers 12 and 13 to the discharge frame 10. By means of the feeding devices 58, the treated log can now be rolled as a whole from the left side of frame 10 as seen in FIG. 5, with the angled pieces directed downwards, or alternately, can be cut into desired lengths with the crosscut saws 54 adjusted appropriately to the length desired, and then passed by means of discharge tubes 55 and connecting pieces 56 from the right side of frame 10 into containers 88 in which they can be transported away from the site.

Of course, variations of the specific construction and arrangement of this type device herein disclosed can be made by those skilled in the art without departing from the invention as defined in the appended claims.

It is claimed:

1. An apparatus for transporting and treating tree trunks, said apparatus comprising a guide frame having a pair of parallel guide tubes extending in a horizontal plane; a winching table disposed adjacent said guide frame and having an intake track inclined from ground level towards said pair of parallel guide tubes and adapted to receive said trunks; means for debarking and debranching said trunks and comprising a housing having an inlet and outlet opening, said inlet opening being aligned with and adjoining one end of said pair of parallel guide tubes; a discharge frame aligned with and disposed adjacent to said outlet opening of said housing and having a plurality of parallel guide tubes and a plurality of parallel discharge tubes for discharging said trunks laterally of said discharge frame, each said plurality of parallel tubes extending at right angles to said pair of parallel guide tubes of said guide frame; transport means associated with said winching table and said guide frame for transporting said trunks onto said inlet track, therefrom to said pair of guide tubes and thereon towards said debarking and debranching means; further transport means associated with said housing of said debarking and debranching means for transporting said trunks from said guide frame through said debarking and debranching means in said housing onto said discharge frame; and additional transport means associated with said discharge frame for transporting said trunks from said discharge frame onto said discharge tubes and for pushing them down from said discharge tubes.

2. The apparatus according to claim 1, wherein said guide frame comprises a plurality of vertical retaining tubes, a plurality of vertical support columns slidably mounted in said retaining tubes and carrying said parallel guide tubes, and means to adjustaby fixed said support columns in a corresponding retaining tube.

3. The apparatus according to claim 1, further comprising a plurality of guiding rollers disposed adjacent each of said openings for guiding said trunks through said housing.

4. The apparatus according to claim 1, wherein the tubes of said pair of parallel guide tubes have substantially the length of an average pine tree trunk and are spaced apart a distance corresponding substantially to the maximum diameter of an average pine tree trunk.

5. An apparatus according to claim 1, wherein said winching table is disposed at one lateral side of said guide frame, and comprises a lateral intake track which extends from ground level up to a height above said parallel guide tubes, and a lateral discharge track extending from said height to said parallel guide tubes.

6. An apparatus according to claim 5, wherein said intake and discharge tracks are formed by additional guide tubes extending perpendicular to said pair of parallel guide tubes, and further comprising means to support said additional guide tubes on the ground.

7. An apparatus according to claim 6, further comprising a plurality of arms pivotally mounted on said lateral winching table between said pair of parallel guide tubes and said additional guide tubes, said arms adapted to pivot about vertical axes and forming an extension of said additional guide tubes.

8. An apparatus according to claim 5, wherein said transport means associated with said winding table and said guide frame includes a twin winching means having a pair of cables and a plurality of direction-changing rollers over which said cables pass so that their ends extend perpendicular to said pair of parallel guide tubes.

9. An apparatus according to claim 2, wherein said winching table is disposed at the end of the guide frame which is remote from said inlet opening, and comprises a funnel-shaped intake track of sheet metal, the floor of which slopes up from the ground to said pair of parallel guide tubes and is provided with raised edges.

10. An apparatus acording to claim 9, wherein said transport means includes a winch means having a cable extending parallel to said pair of parallel guide tubes.

11. An apparatus according to claim 1, wherein said discharge frame further comprises a plurality of retaining tubes, a plurality of support columns slidably mounted in said retaining tubes and carrying said parallel guide tubes, and means to adjustably fix said support columns in a corresponding retaining tube.

12. An apparatus according to claim 11, wherein said discharge tubes have a horizontal portion connected to said support columns and an angled portion which is adjustably mounted in said horizontal portion to attain varying positions.

13. The apparatus acording to claim 12, further comprising a plurality of retaining tubes, means mounting said additional retaining tubes to said discharge frame so that said tubes are laterally adjustable with respect to said frame, a plurality of support columns slidably mounted in said retaining tubes, a crosscut saw mounted with respect to said support columns and adapted to cut said trunks as they are discharged from said discharge frame, and means to adjusably fix said support columns in a corresponding retaining tube.

14. An apparatus according to claim 13, wherein said support columns each have on their upper ends a downwardly curved discharge tube forming an extension of said horizontal portion of said discharge tubes, and a plurality of downwardly curved attachement pieces of varying lengths attached to said downwardly curved discharge tubes.

15. An apparatus according to claim 3, wherein said guiding rollers are made of plastic.

16. An apparatus according to claim 3, wherein a portion of said rollers are positioned to engage said trunks from the bottom and have a V-shaped profile.

17. The apparatus according to claim 1, wherein said means for debarking and debranching said trunks further comprise a first pair of movable frame members slidably mounted on said housing for movement in a horizontal direction, saw means carried by one of said frame members for debarking and debranching said trunks, means to move said frame members in at least one horizontal direction, a second pair of movable frame members slidably mounted on said housing and adapted to move in at least one vertical direction, and coupling means mechanically coupling said first pair of frame members to said second pair of frame members so that each pair of frame members moves simultaneously in the same direction with respect to said trunks.

18. The apparatus according to claim 17, wherein said coupling means comprises a plurality of rollers mounted on said housing, and at least two of said frame members; and at least one cable secured at each end to two of said frame members and extending over said rollers in a manner to reverse its direction.

19. The apparatus of claim 18, further comprising a tension spring connecting said cable to said first pair of frame members.

20. Apparatus of claim 17, further comprising at least one roller connected to each of said second pair of frame members and adapted to engage said trunks.

21. An apparatus for debarking and debranching tree trunks, said apparatus comprising a housing, a first pair of movable frame members slidably mounted on said housing for movement in a horizontal direction, saw means carried by one of said frame members for debarking and debranching said trunks, means to move said frame members in at least one horizontal direction, a second pair of movable frame members slidably mounted on said housing and adapted to move in at least one vertical direction, and coupling means mechanically coupling said first pair of frame members to said second pair of frame members so that each pair of frame members moves simultaneously in the same direction with respect to said logs.

22. The apparatus of claim 21, wherein said coupling means comprises a plurality of rollers mounted on said housing, and at least two of said frame members; and at least one cable secured at each end to two of said frame members and extending over said rollers in a manner to reverse its direction.

23. The apparatus of claim 21, further comprising a tension spring connecting said cable to said first pair of frame members.

24. Apparatus of claim 21, further comprising at least one roller connected to each of said second pair of frame members and adapted to engage said trunks.

References Cited

UNITED STATES PATENTS 3,029,848  4/1962  Bombardier _____ 144—3

FRANCIS S. HUSAR, Primary Examiner

U.S. Cl. X.R.

144—2, 3